Oct. 29, 1968

E. S. BAKER 3,408,613

TELEPHONE CONNECTING PANEL AND CONNECTOR THEREFOR

Filed July 20, 1966

INVENTOR

EDWARD S. BAKER

BY

Strauch, Nolan, Neale, Nies & Bronough

ATTORNEYS

United States Patent Office 3,408,613

Patented Oct. 29, 1968

3,408,613

TELEPHONE CONNECTING PANEL AND CONNECTOR THEREFOR

Edward S. Baker, Lawrence, Kans., assignor to Paul H. Snider, Wichita, Kans.

Filed July 20, 1966, Ser. No. 566,541
14 Claims. (Cl. 339—18)

This invention pertains to an electric circuit interconnecting device for use with multiple circuit assembly boards such as are used in automatic telephone exchanges.

In modern telephone installations, four circuit connections are required for each subscriber, and a given substation may serve as many as 10,000 subscribers. Thus, some 40,000 circuits have to be made in initial installation or in a change-over in equipment, location or the like.

In systems presently in use, such as described in the patent to Ewald, No. 2,936,407 of May 10, 1960, entitled, "Mounting and Connecting Apparatus," the circuits and their components are assembled on a panel structure which provides direct access to terminal pins or lugs on one side thereof. In normal practice, subscriber connections (four for each) are made by winding jumper wires about pairs of pins to be coupled and soldering them in place. In case of discontinuance of service, changeover of subscribers or replacement of equipment, the previous connections have to be removed, and new ones installed and soldered. Naturally, in case of extensive changeover the manpower requirements are tremendous, and it is not uncommon that wiring specialists from a large service area have to be brought together to effect a complete change-over of an exchange during one night.

It is the object of this invention, therefore to provide a simplified and rapidly installable connector in the nature of a plug which in a single placement on a terminal board will establish all necessary connections for a given subscriber.

It is a further object in connection with the above plug to construct the same of molded insulating material, to design same for low cost quantity production and to eliminate the need for soldered connections consistently with dependable results.

The above and other related objects of this invention will become more fully apparent from the claims and from the description as it proceeds in connection with the drawings wherein:

Figure 8:
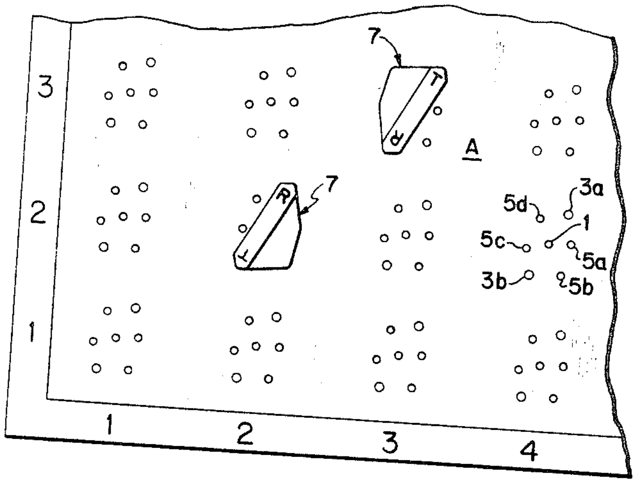
FIGURE 8 is a fragmentary view of a connector panel showing clusters of connecting terminals, with connectors of this invention installed in two alternative positions thereon.

Referring to FIGURE 8, which shows a fragmentary, corner portion of a connector panel A, it will be observed that seven-pin clusters of terminals are arranged in lines and columns which are identified by numbers arranged along the frame members of the panel. The terminals of all clusters are arranged alike and consist of seven pins; one of which (1) lies in the center while the remaining six (3 and 5) are arranged roughly in a circle about it. Two diametrically opposed pins 3 are somewhat heavier and longer than the remaining pins 5 surrounding center pin 1. The latter is not involved in the present coupler invention, as the coupler is intended to make but two connections, each between a pair of the peripherally arranged pins, in each of its alternative settings. Couplers 7 are shown in connection with two clusters (on coordinates 2—2 and 3—3) to illustrate their capability of making alternative connections. Thus on cluster 3—3 the connector couples pins 3*a* and 5*d*, as well as pins 3*b* and 5*c*; on cluster 2—2, the coupling is between pins 3*a* and 5*a*, and pins 3*b* and 5*b*.

Figure 1:
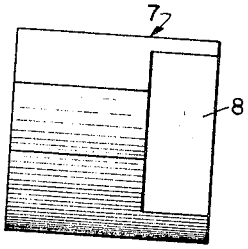
FIGURE 1 is a front elevation of the connector.
Figure 2:
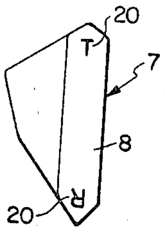
FIGURE 2 is a side elevation thereof.
Figure 3:
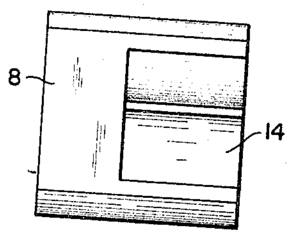
FIGURE 3 is a rear elevation of same.

Referring now to the construction of the connector per se, it will be observed from the top view thereof (FIGURE 2), that it is of generally triangular outline, and has a hand engaged portion 8 extending along the long side thereof. Below the hand engaged portion the triangle is cut away so that the bottom of the connector has the appearance of an L, comprising legs 9 and 10 having channels 11 and 13, respectively. Between said channels, and generally within the periphery of the triangular outline there is an open space 14, which provides clearance for center pin 1 of a cluster, below web 15 which interconnects the two channel legs.

Figure 5:
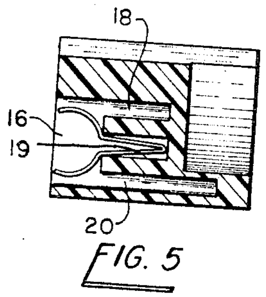
FIGURE 5 is a cross-sectional view along the line 5—5 of FIGURE 4, through one contact channel.
Figure 4:
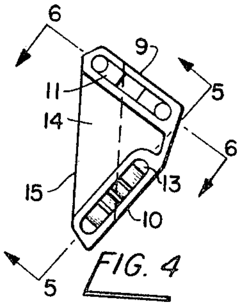
FIGURE 4 is a bottom view of the connector showing the substantially L-shaped configuration of its contact making channels.
Figure 6:
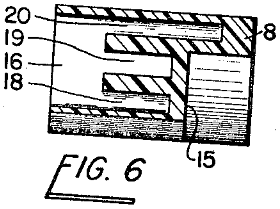
FIGURE 6 is a cross-sectional view along line 6—6 of FIGURE 4, through the other channel of the connector.
Figure 7:
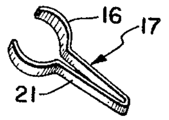
FIGURE 7 is a perspective view of a connecting spring utilized to electrically couple a pair of pins (terminals) entering the channel.

As will be evident from cross-sectional FIGURES 5 and 6, channels 9 and 10 are of substantially identical construction. Each of them has an elongated open space 16 extending substantially the entire length of the leg, and of depth sufficient to accommodate the loop portions 16 of spring clip 17 shown in FIGURE 5. From the elongated channel space there extend two relatively short receptacles 18 and 19, up to the web 15 level of the connector, and one somewhat longer receptacle 20, which penetrates into the handle portion thereof. The middle receptacle 19 receives base portion 21 of clip 17, in the manner illustrated in FIGURE 5, while the other elongated receptacles extending from the channel receive terminals pins, with electrical connections being made through the clip loops 16 engaging therewith, and biasing them against the end walls of the channels.

The entire connector 7 may be molded as a unitary plastic block, and spring clips 17 are inserted in each of the channels. The connector is then ready to be applied to the desired cluster of terminals in one of its alternative aspects (shown in FIGURE 8) to make either a T ("tip") or R ("ring") connection for a selected subscriber. Indicia characters 20, T and R (see FIGURE 2) are provided on the hand engaged portion to facilitate identification of the type of connection established at each cluster.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a telephone exchange connector panel assembly capable of supporting and electrically interconnecting a plurality of component networks, in which certain components and conductors are mounted on one side of a board-like assembly while the connecting terminals thereof extend to the opposite side and are arranged in groups one for each subscriber, said groups forming lines and columns, a plurality of pin clusters comprising said terminals of a group, one pin being centrally located while the remaining pins substantially encircle said one pin, certain of said surrounding pins being substantially longer than the other pins and a coupling connector for selectively coupling certain pairs of said remaining pins in different relations by alternative positioning thereof, said plug in each of its alternative positions coupling both said longer pins with different shorter pins.

2. A device according to claim 1 in which said connector is generally L-shaped at its pin-engaging end, and wherein each leg of the L carries a spring coupling clip which engages one elongated pin and one shorter pin.

3. A device according to claim 2 in which the longer pins coupled are received at the outer edges of the L whereas the shorter pins are received at the apex thereof.

4. A device according to claim 3 wherein the legs of the L form elongated channels in which the spring couplings clips are centrally mounted, said clips having opposed spring legs, and wherein each of said pins to be coupled by a clip enters between the end of a channel and a spring leg.

5. A device according to claim 4 wherein each channel is of a length sufficient to span two pins and of a depth somewhat less than the length of shorter pins, and wherein a recessed opening extends from the inner end of each channel to accommodate the full length of shorter pins.

6. A device according to claim 4 in which the connector is provided with a flat linear hand engaged portion extending diagonally across the outer ends of the L, and wherein pin-receiving receptacles are formed therein in communication with the oblong channels at the outer edges thereof to accommodate the elongated pins.

7. A device according to claim 6 wherein the two legs of the connector are connected by a web and wherein said legs and web form a triangular opening which allows clearance for the center pin of a cluster.

8. A device according to claim 8 wherein the connector with its channels and hand engaged portion is molded of plastic material, and wherein a further receptacle is provided in each leg intermediate the pin receptacles extending therefrom which forms a seat for the spring clip.

9. A device according to claim 7 wherein the respective locations of the pin-receiving receptacles in the hand engaged portion permit only two alternative positions of a connector on any pin cluster.

10. A connector for a telephone exchange panel or the like, comprising a unitary dielectric block having a base of substantially L-shaped configuration, a web portion overlying said base and interconnecting the legs thereof, a hand engaged portion overlying said web and extending across same from terminal to terminal of the L-shaped base, a channel within each leg of said L-shaped base, apertures at the end of each channel for receiving terminals to be connected, a further aperture intermediate said end apertures and a spring clip having a base portion fitting into said last aperture and spring like wiping contacts on said clip serving to couple terminals received in the end apertures.

11. A connector according to claim 10 wherein the terminals receiving apertures are in line with the ends of the channels, whereby the terminals entering the channels are guided between the ends thereof and the spring clip and into said apertures.

12. A connector according to claim 11 wherein the apertures at the ends of the base are longer than those at the apex thereof and penetrate into the hand engaged portion.

13. A connector for a telephone exchange panel or the like comprising a unitary dielectric block, channels angling off from a corner thereof, a hand engaged portion extending from the top thereof and reaching across the block from the end of one channel to the end of another, a spring clip centrally mounted within each channel, for engagement with terminals entering at the ends thereof, and apertures extending from the channels to receive said terminals.

14. A connector according to claim 13 wherein the apertures at one end of each channel are longer than the apertures at the opposite end thereof, and wherein said elongated apertures extend into the hand engaged portion.

References Cited

UNITED STATES PATENTS

| | | | |
|---|---|---|---|
| 2,594,069 | 4/1952 | Poehlmann | 339—18 |
| 3,353,139 | 11/1967 | Ribbelink | 339—18 |

MARVIN A. CHAMPION, *Primary Examiner.*

PATRICK C. CLIFFORD, *Assistant Examiner.*